United States Patent [19]

Peters

[11] 4,327,013

[45] Apr. 27, 1982

[54] POLY(ACRYLATE) CONTAINING COMPOSITIONS AND PROCESS FOR PRODUCING MOLDED ARTICLES

[75] Inventor: Edward N. Peters, Piscataway, N.J.

[73] Assignee: Union Carbide Corporation, Danbury, Conn.

[21] Appl. No.: 129,883

[22] Filed: Mar. 27, 1980

Related U.S. Application Data

[63] Continuation-in-part of Ser. No. 35,012, May 1, 1979, abandoned.

[51] Int. Cl.$^3$ ............................................. C08K 7/14
[52] U.S. Cl. .................................. 524/538; 525/426; 524/492; 524/496
[58] Field of Search ............... 260/42.17, 42.18, 42.52; 525/426

[56] References Cited

U.S. PATENT DOCUMENTS

| | | | |
|---|---|---|---|
| 3,373,075 | 3/1968 | Fekete et al. | 260/42.52 |
| 3,645,984 | 2/1972 | Dowbenko et al. | 204/159.22 |
| 3,789,051 | 1/1974 | Rees | 260/41 A |
| 3,968,073 | 7/1976 | Hara et al. | 260/42.18 |
| 4,107,845 | 8/1978 | Lee et al. | 260/42.17 |
| 4,131,729 | 12/1978 | Schmitt et al. | 260/42.15 |
| 4,156,766 | 5/1979 | Feldt | 260/42.17 |

OTHER PUBLICATIONS

Chemical Abstract, vol. 66, 1967, 47006j.
Chemical Abstract, vol. 67, 1967, 91302x.
Chemical Abstract, vol. 69, 1968, 87785f.
Chemical Abstract, vol. 69, 1968, 36662f.
Chemical Abstract, vol. 73, 1970, 110576g.
Chemical Abstract, vol. 74, 1971, 126623b.
Chemical Abstract, vol. 79, 1973, 54156e.
Chemical Abstract, vol. 87, 1977, 185437k.
Chemical Abstract, vol. 71, 1969, 125431p.
Chemical Abstract, vol. 72, 1970, 56250k.
Chemical Abstract, vol. 75, 1971, 37500n.
Chemical Abstract, vol. 72, 1970, 35795b.
Chemical Abstract, vol. 73, 1970, 59316t.
Chemical Abstract, vol. 81, 1974, 106249a.
Chemical Abstract, vol. 84, 1976, 111697n.
Chemical Abstract, vol. 84, 1976, 11169p.
Chemical Abstract, vol. 64, 1966, 5270n.
Chemical Abstract, vol. 66, 1967, 66333e.
Chemical Abstract, vol. 72, 1970, 67850g.
Chemical Abstract, vol. 82, 1975, 99135a.
Chemical Abstract, vol. 83, 1975, 60337p.
Chemical Abstract, vol. 86, 1977, 30489j.

*Primary Examiner*—Lewis T. Jacobs
*Attorney, Agent, or Firm*—Donald M. Papuga

[57] ABSTRACT

This invention is directed to a curable molding composition which comprises a mixture of (a) one or more fibers with a melting point or a glass transition temperature above about 130° C., (b) a poly(acrylate) characterized by the following empirical formula:

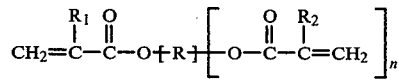

wherein R is the hydroxy-free residue of an organic polyhydric alcohol which contained alcoholic hydroxyl groups bonded to different carbon atoms, $R_1$ and $R_2$ are independently hydrogen or methyl, n is 1 to 3 (c) an ethylenically unsaturated monomer which is soluble in and copolymerizable with (b), and (d) an elevated temperature free-radical curing catalyst capable of affecting the co-reaction of (b) with (c), said mixture containing (i) from about 15 to about 80 weight percent of (a), (ii) from about 5 to about 60 weight percent of (b), and (iii) from about 5 to about 60 weight percent of (c), and (iv) from about 0.2 to about 3 weight percent of (d), and wherein (b) plus (c) has a viscosity of from about 1 to about 50 centipoise. Additionally this invention concerns a process for producing high performance reinforced thermoset molded articles. The process comprises (I) forming a mixture of said composition, (II) providing said composition into a heatable mold and (III) molding said mixture at a temperature sufficient to cause the initiation of the co-reaction of (b) with (c) at a temperature not greater than 150° C. and (IV) completing said molding in less than 6 minutes from the time of initiation of said co-reaction.

13 Claims, No Drawings

POLY(ACRYLATE) CONTAINING COMPOSITIONS AND PROCESS FOR PRODUCING MOLDED ARTICLES

This application is a continuation-in-part application of U.S. patent application Ser. No. 035,012, filed May 1, 1979, and now abandoned.

This invention relates to a thermosettable fiber-reinforced poly(acrylate) molding composition and a process for making high performance reinforced molded articles therefrom. The molded articles are produced by a mold cycle that is typically less than about 6 minutes from the time the cure of the resin is initiated. The present process achieves rapid production of molded articles by molding techniques such as, transfer molding and injection molding. Also, the cure cycle time in a compression molding is reduced.

Bis(acrylates) of diols have been known for a long period of time. For example, Dowbenko et al, U.S. Pat. No. 3,645,984, patented Feb. 29, 1972, discloses the bis(acrylate) of hydroxy pivalyl hydroxypivalate (known as "Ester Diol 204," sold by Union Carbide Corporation, New York, N.Y.). According to this patent the bis(acrylate) is a highly radiation-sensitive material which polymerizes to form strong and stain-resistant materials which can be employed as coatings. The bis(acrylate) of the patent is described as a material which can be homopolymerized in the presence of free-radical catalysts or by radiation, or copolymerized with other monomers such as, acrylic monomers. Additionally, the patent describes that the bis(acrylate) may be added to other polymers which are used together as mixtures or co-cured together. There is no disclosure in the patent of using the bis(acrylate) as a reactant in the formation of a glass fiber reinforced plastic article.

Rees et al, U.S. Pat. No. 3,789,051, patented January 29, 1974, describes a reinforced resin composition which may optionally contain a bis(acrylate) of a diol. This patent describes the use of ethylene glycol dimethacrylate in a number of its examples. The multicomponent system of this patent requires the presence of a thermoplastic polymer, a substantial amount of an ethylenically unsaturated carboxylic acid, and a substantial amount of a "base monomer." Thus, the optional ethylene glycol diacrylate ingredient clearly plays a minimal role in the system. However, the patent does describe making glass fiber reinforced molded articles utilizing a very complex reaction mixture a small part of which can be ethylene glycol dimethacrylate.

The literature contains a number of references directed to the use of diacrylates and dimethacrylates of glycols and alkoxylated bisphenols. For example, CA, 66, 1967, 47006j, describes a binder for glass laminates which consists of a glycol phthalate-maleate condensate combined with diethylene glycol dimethacrylate which is cured with a combination of cumene hydroperoxide and cobalt naphthenate which provides a gel time of 10–11 hours for the mixture. According to this reference, when 5 percent methyethyl ketone peroxide and 7 percent of cobalt napthenate are used, "the gel time decreased to 3–4 hours." Further disclosure of an ethylene glycol dimethyacrylate is found in CA, 67, 1967, 91302x.

A glass reinforced composite made from a triethylene glycol dimethacrylate and polyacrylate resin is described in CA, 69, 1968, 87785f. Similar compositions are described in CA, 69, 1968, 3662f. CA, 73, 1970, 10576g describes the addition of 1.1 percent of "oligoesters" such as TDM-3 (characterized as the triethylene glycol dimethacrylate in the previous reference) to an unspecified binder for glass fibers, which contains methyl methacrylate and an initiator.

In CA, 74, 1971, 126623b, the viscosity of uncured fiberglass containing molding materials, made from an unsaturated polyester resin, was decreased by increasing the concentration of poly(triethylene glycol dimethacrylate) in the material. The bending strength and heat stability of hardened resin reached a maximum with 40 percent of the poly(dimethacrylate) and the compressive strength decreased with increasing content of the poly(dimethacrylate).

CA, 79, 1973, 5415e, describes using several polyesters, one of which is a copolymeric product of a polyester from ethylene glycol, maleic anhydride and chlorendic anhydride with diethylene glycol diacrylate and diethylene glycol dimethacrylate. The deformation properties of glass-fabric laminate made with certain binders was studied.

CA, 87, 1977, 185437k describes glass fiber reinforced resins based upon a monomer "Diacryl 101" indicated to be the diacrylate of ethoxylated bisphenol-A.

French Pat. No. 1,567,710, referred to in CA, 71, 1969, 125431p, describes the manufacture of the diacrylate of dipropoxylated bisphenol-F which is thereafter diluted with styrene in a ratio of about 30 parts by weight of styrene to about 70 parts by weight of the bis(acrylate). This material is reacted in the presence of benzoyl peroxide to effect a cured product in about 14 minutes and 30 seconds. The same resin is also catalyzed with 1 percent benzoyl peroxide as a 50 percent solution in tricresylphosphate and 0.15 percent diethylaniline. The resulting resin is used to make a fiberglass reinforced plastic laminate containing 12 layers of fiber resulting in a laminated sheet about 3 millimeters thick. The sheet sets in about 1 hour and then is heated at 115° C. for 24 hours. Methyl methacrylate was also used to produce the bis(acrylate) product which was also combined with styrene and evaluated for its SPI gel test time. Further experiments were carried out in the patent making the dimethacrylate of ethylene glcyol which was polymerized with benzoyl peroxide. Other examples in the patent describe forming a polymethacrylate of sorbitol which was cured with benzoyl peroxide. Other variations characterizing a variety of polymer compositions, many of which utilize one or more of the bis(acrylates) as a component are described in the patent.

Bis(acrylates) of alkoxylated bisphenol-A and other diols are described in several references where they are utilized primarily in the manufacture of dental compositions. See, for example, CA, 72, 1970, 56250k, CA, 75, 1971, 37500n, CA, 72, 1970, 35795b, CA, 73, 1970, 59316t, CA, 81, 1974, 106249a, CA, 84, 1976, 111697n and 11169p.

CA, 64, 1967, 5270h describes the manufacture of a polyester resin composition of an α,β-unsaturated polycarboxylic acid, an acrylate or methacrylate of ethylene or propylene polyglycol, having a molecular weight of 350–850 (such as polyethylene glycol 400 or 600), and a polymerizable olefin such as, styrene.

Adhesive compositions are described in CA, 66, 1967, 66333e. These compositions comprise tetraethylene glycol dimethacrylate combined with a cumylhydroperoxide and a styrene-acrylate copolymer, i.e., "Pliolite AC". The adhesive is described as suitable for joining sealed blocks to provide a bond having a tensile strength of 3040 psi.

CA, 72, 1970, 6785g, describes the use of diethylene glycol diacrylate as one of a number of ethylenically unsaturated comonomers which could be used in a conventional type polyester composition.

A process for making polystyrene beads is described in CA, 82, 1975, 99135a. A polymethacrylate of a polyol is utilized in a styrene composition to give "non tacky beads with improved melting properties."

CA, 83, 1975, 60337p, discloses cross-linking a thermoplastic addition copolymer using a cross-linking agent such as, pentaerythritol tetramethacrylate. Certain ion exchange resins utilize an ethylene glycol dimethacrylate as one of the comonomers in forming a sulfonated divinyl benzene type structure, as described in CA, 87, 1977, 30489j.

The term "vinyl esters" is known in the reinforced plastics industry as the reaction products of epoxy resin with acrylic or methacrylic acids. These vinyl esters are hydroxy containing resins.

Methacrylate-capped epoxy resins are commercially available from Dow Chemical Company, Derekane 411, and from Shell Chemical Company, Epocryl 12. These resins have the following structure:

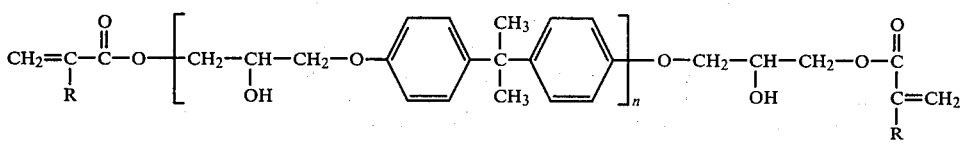

where R=H, CH$_3$

Fiberglass has been widely used as a reinforcement in the manufacture of thermoset molded articles. These types of articles have been termed "Glass Reinforced Plastics" (GRP) and "Glass Fiber Reinforced Plastics" (GFR). The fiberglass content in these thermoset molded articles ranges from about 15 to about 70–80 weight percent. Polyester resins are used primarily as the resin component in these glass reinforced thermoset plastics. These polyester resins are unsaturated polyester resins. The unsaturation is provided by maleic and fumarate unsaturation within the backbone of the polyester, prior to cross-linking. These polyesters are formed by reacting maleic acid or anhydride with a dihydric alcohol or a combination of a dihydric alcohol and a dicarboxylic acid or anhydride such as, phthalic acid or anhydride, isophthalic acid, terephthalic acid or a saturated aliphatic dicarboxylic acid, such as adipic acid. The dihydric alcohols which are typically used to make these polyesters include ethylene glycol usually employed in combination with other glycols, i.e., 1,2-propylene glycol, dipropylene glycol, diethylene glycol, and the like. Some unsaturated polyester resins are made by the reaction of carbic acid, which is the Diels-Alders reaction product of maleic anhydride and cyclopentadiene or dicyclopentadiene, with a polyol and additional maleic anhydride. The cyclopentadiene and dicyclopentadiene can also be reacted with a preformed maleic derived unsaturated polyester resin which forms either a cyclopentadiene adduct with the terminal hydroxyl or carboxyl, or internal Diel-Alders reaction products. These resins have high viscosities which are substantially reduced when they are combined with styrene.

These aforedescribed polyester resins have been employed in the manufacture of a variety of glass reinforced products by different types of processes. The processes of forming glass reinforced products are generally in two categories, i.e., wet lay up and thickened processes. Wet lay up processes include the following: pre-impregnation of a fibrous mass with resin, followed by compression molding; preforming in which cut fiber and resin are sprayed onto a mold form itself; mat molding, in which liquid resin is poured onto a mat while the mat is disposed in a compression mold; bulk molding, in which a non-thickened mixture of staple fiber and polyester resin are poured into a mold.

In thickened processes, polyester resin carboxylic acid groups react with an inorganic alkaline earth metal oxide or hydroxide such as, magnesium oxide and calcium hydroxide, to increase the viscosity of the fiber containing resin so that it has a non-liquid paste-like quality. The resin can then be handled and deposited within the framework of a mold to achieve a more uniform and more convenient molding. Thus, sheet molding compounds (SMC) are formed by depositing resins across a layer of cut fiberglass fibers randomly deposited upon a polyethylene film. The polyethylene film is sandwiched by another layer of polyethylene film and the combination is fed through nip rollers which blends the polyester resin within the fibrous mat to form a sheet. The sheet is allowed to stand so that reaction occurs between the carboxy groups of the polyester resin and the alkaline earth metal oxide filler. The resin increases in viscosity and it can then be more easily handled in the molding procedure. This same technique can be utilized in producing bulk molding compounds (BMC). Alkaline earth metal is added to the bulk molding composition in an amount sufficient to thicken the composition to a desired viscosity so that it can be readily handled. The thickened bulk molding compounds are employed in transfer and injection moldings.

Thickened bulk molding compounds, however, have not been widely used in injection molding since their viscosities are normally higher than is desirable for effective molding, and the equipment required to mold the high viscosity thickened bulk molding compound is extremely expensive, large, and cumbersome to operate. A further disadvantage is using thickened bulk molding compounds in an injection molding process is that the fibers must be of very short length in order to effectively distribute the fiber throughout the mold. The short lengths of the fibers minimizes the reinforcement so that the resulting molded article does not have optimum performance characteristics particularly, strength properties. Moreover, such short fibers tend to become oriented along the flow of the compound in the mold thereby reducing the strength of the molded article in the direction traverse of the flow.

However, polyester resin systems have been developed which provide good surface properties to the molded product. These polyester resin systems are used in the manufacture of "Class A" molded products employed in the automotive industry. These products have extremely low profile surfaces which are free of warpage, undulations, and fiber protrusions. This low profile results from adding a low profile additive to the BMC or SMC formulations. A low profile additive is a thermoplastic compound which contains a sufficient number of carboxylic acid groups allowing it to become intricately bound into the resin system so that it is not exuded therefrom. Low profile additives can also be utilized in wet lay up processes to form glass reinforced products. Non-carboxylated containing thermoplastics are very effective low profile additives for resin systems used in the wet lay up process although carboxylated thermoplastics presently available for the same purpose can be so utilized.

The glass fiber reinforced polyester resin systems which are used to form "Class A" products typically contain from about 15 to 40 weight percent of glass fiber. These fiber reinforced polyester resin systems are used to mold products where surface appearance is very important, but strength properties are not necessarily as important. However, structural products are expected to have high strength properties. For example, "Class A" products cannot be used effectively in automotive applications where structural integrity is a critical factor. Recently, a series of glass fiber reinforced polyester resins have been developed which utilize the thickening characteristics of SMC, BMC, and the like, but which contain extremely high concentrations of glass fiber. For example, a series of polyester compositions containing from about 50 to about 75 weight percent of glass fibers have been developed. These polyester compositions can be used in making molded products, but typically, they do not possess the desirable surface characteristics which would be a "Class A" product. However, their strength characteristics, which is supplied by the high concentration of glass fibers, provides unique markets for these glass fiber reinforced polyester resins. The fibers in these reinforced resins are either unidirectionally aligned, as from continuous filament tow, or are randomly distributed in long fibers in a polyester mat, or from a combination thereof, to supply enhanced multidirectional strength to the molded article. The high glass fiber containing polyester resins are sheet molding compounds, XMC, HMC, (XMC and HMC are trademarks of PPG Industries, Inc.) and MSMC-R-Fiber content such as 50–65, (trademarks of Owens Corning Fiberglass Corp.). These high glass fiber content resin systems are molded only by compression molding procedures.

THE INVENTION

This invention is directed to a fiber-reinforced poly(acrylate) molding composition and to a rapid process for making high performance reinforced thermoset molded articles therefrom.

The resin system of poly(acrylate) and ethylenically unsaturated monomer of this composition has a very low viscosity, i.e., from about 1 to about 50 centipoises, preferably from about 1 to about 10 centipoise, so that it can be used to produce thermoset resin articles containing up to about 80 weight percent of fibers. These high concentrations of fibers in the molded article have been produced heretofore only be compression molding which is a time consuming and vigorous molding procedure.

The composition of this invention can be used to produce thermostat molded articles by rapid injection molding techniques. The composition herein does not require the use of thickening agent so that it does not have the resulting disadvantages when thickening agents are used.

The composition comprises a mixture of (a) one or more fibers with a melting point or a glass transition temperature above about 130° C., (b) a poly(acrylate) characterized by the following empirical formula:

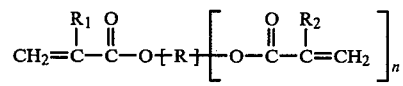

wherein R is the hydroxy-free residue of an organic polyhydric alcohol which contained alcoholic hydroxyl groups bonded to different carbon atoms, $R_1$ and $R_2$ independently hydrogen or methyl, n is 1 to 3 (c) an ethylenically unsaturated monomer which is soluble in and copolymerizable with (b), and (d) an elevated temperature free-radical curing catalyst capable of effecting the co-reaction of (b) with (c), said mixture containing (i) from about 15 to about 80 weight percent of (a), (ii) from about 5 to about 60 weight percent of (b), and (iii) from about 5 to about 60 weight percent of (c), and (iv) from about 0.2 to about 3 weight percent of (d) and wherein (b) plus (c) has a viscosity of from about 1 to about 50 centipoise.

The polyhydric alcohol suitable for use herein is typically a polyhydric alcohol which contains at least two carbon atoms and which may contain from 2 to 4, inclusive, hydroxyl groups. These polyhydric alcohols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: diethylene glycol; 2,2,4-trimethyl-1,3-pentanediol; dipropylene glycol; propylene glycol; polypropylene glycol having an average molecular weight of about 150 to about 600, triethylene glycol; 1-4-cyclohexane dimethanol; neopentylglycol; 2,2-dimethyl-3-hydroxylpropyl-2,2-dimethyl-3-hydroxypropionate; polyethylene glycol having an average molecular weight of about 150 to about 600; 1,1-isopropylidene-bis(p-phenylene-oxy)-di-β-ethanol; 1,1′-isopropylidene-bis(p-phenylene-oxy)di-ω-propanol-2; triethanolamine; 1,3-butanediol; tetraethylene glycol; 2,2-bis(4-hydroxyphenyl)propane; glycerine; trimethylol propane; 1,4-butanediol, the polycarprolactone ester of trimethylol propane which contains about 1.5 moles of caprolactone ester; the polycaprolactone ester of trimethylol propane which contains about 3.6 moles of caprolactone; 2-ethyl-1,3-hexanediol; 1,5-pentanediol, tripropylene glycol, 2,2-bis(4-hydroxycyclohexyl)propane; 1,2,6-hexane triol; 1,3-propanediol; and the like. The use of mixtures of the aforementioned polyols in this invention is very desirable.

The poly(acrylate) of the aforementioned organic polyhydric alcohol can be prepared by the reaction of acrylic acid or methacrylic acid with the polyhydric alcohol under conditions well known in the art.

Suitable ethylenically unsaturated monomers which may be employed in the practice of this invention are one or more ethylenically unsaturated copolymerizable monomers which are soluble in and copolymerizable with the poly(acrylate) of the polyhydric alcohol. These ethylenically unsaturated monomers contain a —CH=C< group, and preferably a CH$_2$=C< group. These monomers include styrene and its derivatives and homologues, diallylphthalate, divinylbenzene, acrylic acid or methacrylic acid and their derivatives such as their esters, amides or nitriles, e.g. methyl acrylate, methyl methacrylate, n-butyl methacrylate, acrylamide, methacrylamide, acrylonitrile, methacrylonitrile, and the like. Also, the monomers include vinyl ethers and esters, e.g. vinyl acetate, vinyl propionate, methylvinyl ether, and the like, triallyl cyanurate, 1,3-butanediol dimethacrylate, and the like. Mixtures of the aforementioned monomers may be effectively employed in the practice of this invention.

The most preferred ethylenically unsaturated monomer contemplated in the practice of this invention is styrene.

The elevated temperature free-radical curing catalysts which initiate curing at 150° C. or less are soluble in and initiate the co-reaction of the poly(acrylate) and monoethylenically unsaturated monomer are azo and peroxide curing agents. These azo and peroxide curing agents are described by Gallagher, et al "Organic Peroxides Review," "PLASTICS DESIGN & PROCESSING" July, 1978, pages 38–42, and August, 1978, pages 60–67, inclusive. The technology disclosed in those two articles are incorporated herein by reference. The choice of the specific peroxide or azo initiators for the purpose of curing the composition of this invention are within the purview of those having skill in this art and the manner in which such peroxides and azo initiators operate to effect a desirable cure is generally characterized in the aforementioned articles.

The aforementioned Gallagher et al articles, describe a variety of peroxides and azo initiators which can cause the co-reaction of the poly(acrylate) of the polyhydric alcohol, as defined above, with the monoethylenically unsaturated monomer utilized in the composition. The Gallagher et al articles clearly indicate that there are a variety of organic peroxides particularly those which contain a variety of activators (promoters) which cause the decomposition of the peroxide and formation of free radicals for effecting the catalytic reaction at temperatures as low as room temperature. In addition, as pointed out in part 2, referring to high temperature cure of polyesters with organic peroxide and azo initiators, there are a wide variety of peroxides which have a 10 hour half life below 150° C., and such indicates the kind of initiators which could be employed in the practice of this invention to effect the co-reaction of the bis(acrylate) with the monoethylenically unsaturated monomer. In particular, reference is made to Tables 1, 2 and 3 of part 2 of the Gallagher et al series of articles relating to "Organic Peroxide Review" mentioned above. Those tables characterize specific groups of peroxide and azo compounds which are very desirable in the practice of this invention to effect the desired co-reaction. The selection of free-radical curing catalysts which are capable of effecting the initiation of the reaction herein set forth is very well known in the art and the Gallagher et al articles do not in any way limit the scope of the art in respect to that which is suitable in the practice of this invention and for these purposes.

Additionally, the organic peroxides can be used in combination with cure accelerators such as cobalt compounds. These compounds operate by decomposing the peroxide at a temperature below their normal activation or decomposition temperature.

The fibers which are suitable for use in this invention have a melting point or a glass transition temperature above about 130° C. These fibers include fiberglass, carbon fibers (The carbon fibers include those having a high Young's modulus of elasticity and high tensile strength. These carbon fibers may be produced from "graphitizable" materials such as is described in U.S. Pat. No. 4,005,183), graphite fibers, aromatic polyamide fibers (such as aramid fibers sold by E. I. DuPont Nemours, Wilmington, Delaware under the treatment of Kevlar), metal fibers, such as aluminum and steel, boron fibers and the like. The preferred fibers are fiberglass, carbon fibers and aromatic polyamide fibers.

The fiberglass which is utilized in the composition of this invention can be continuous filament fibers, and cut staple fiber, typically made from E-glass. As a rule, such glasses contain sizing and in this particular case will contain an organic silane on its surface to enhance the compatibility of the composition with the surface of the glass fibers.

The resins used to prepare the composition of this invention are prepared by solution blending a poly(acrylate), an ethylenically unsaturated monomer and a free-radical curing agent at ambient temperature.

The composition herein, prior to its cure, is essentially a mixture of a difunctional compound and a monofunctional compound, the functionally derived from the ethylenic unsaturation. Thus, the term "resin portion" herein includes such a mixture.

The composition of this invention is prepared by injecting the resin portion into a bed of one or more of the fibers at a temperature of from about 120° to about 150° C. and pressure of from about 100 to 6000 psi. The upper limit of pressure is dependent upon the clamping characteristics of the press.

When the poly(acrylate) and ethylenically unsaturated monomer are copolymerized, a "networklike" copolymer is produced which, in combination with the fiber reinforcement possess superior strength properties.

The compositions herein can contain additives such as mold release agents, pigments, and the like.

A unique aspect of this invention is that an extremely rapid cure of the composition is achieved to produce a molded product. This rapid cure is achieved by heating the composition to a temperature which is sufficient to cause the initiation of the co-reaction of the poly(acrylate) and the ethylenically unsaturated monomer. This rapid cure results in completion of the molding operation, in less than about 6 minutes from the time the co-reaction is initiated.

The rapid process for making high performance reinforced thermoset molded articles comprises (I) forming a mixture of (a) one or more fibers with a melting point or a glass transition temperature above about 130° C., (b) a poly(acrylate) characterized by the following empirical formula:

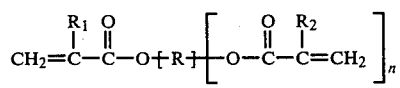

wherein R is the hydroxy-free residue of an organic polyhydric alcohol which contained the alcoholic hydroxyl groups bonded to different carbon atoms, R$_1$ and R$_2$ are independently hydrogen or methyl, n is 1 to 3, (c) an ethylenically unsaturated monomer which is soluble and copolymerizable with (b), and (d) an elevated temperature free-radical curing catalyst capable of affecting the initiation, at a temperature not greater than 150° C., of the co-reaction of (b) with (c) and the cure of the mixture within 6 minutes of the initiation of said reaction. This mixture contains (i) from about 15 to about 80 weight percent of (a), (ii) from about 5 to about 60 weight percent of (b), and (iii) from 5 to about 60 weight percent of (c), and (iv) from about 0.2 to about 3 weight of (d). The composition is provided into a heatable mold and molding of the mixture is effected at a temperature sufficient to cause the initiation of the co-reaction of (b) with (c) at a temperature not greater than 150° C. and the completion of molding in less than 6 minutes from the time of initiation of said co-reaction.

In the most desirable embodiment of this invention, the mixture is provided within the mold by first supplying one or more of the fibers within a mold and thereafter supplying the remaining ingredients of the composition to said fibers contained in the mold. The combination of (b) and (c) has very low viscosities, such as, viscosity of about one to about 50 centipoises, preferably less than about 10 centipoises, at room temperature (about 23° C.). Thus, due to the low viscosity of the combination of (b) and (c), the resin system herein can be utilized in an injection molding system. In carrying out the process herein, the fibers are first inserted into a mold which is a partitionable mold allowing for ready entry of these materials. The mold is then closed. The mold has an entry port for injection of the remainder of the composition. Thereafter, the remainder of the composition is injected into the mold to readily wet and surround and totally fill the mold. Heat is then supplied to the mold to effect the initiation of the reaction resulting in an exothermic reaction which, within 6 minutes, achieves a final cure of the reaction product and a completely cured molded product which can be easily removed from the mold and immediately handled.

The preferred procedure for producing a molded article from this composition is described in copending U.S. patent application Ser. No. (035,111) entitled "Molding Process and Apparatus Therefore," filed on May 1, 1979 in the name of R. Angell, Jr. Specifically, this process, as described in said patent application Ser. No. 035,111, for rapidly fabricating fiber reinforced thermoset resin articles in which the fiber reinforcement is one or more fibers with a melting point or a glass transition temperature above about 130° C., comprises the steps of (a) providing one or more of said fibers in the form of an interlocked mass in a heatable matched metal die mold, (b) providing in an accumulator zone a liquid body of a thermosettable organic material having a viscosity determined at 120° C., in the absence of curing agent therefore, of less than about 50 centipoises, and which is curable upon heating to a thermoset resin composition, the viscosity of said liquid body being maintained essentially constant in the accumulator zone by keeping its temperature below that at which curing of said materials is substantial, (c) closing the mold containing the web, (d) injecting at least a portion of said thermosettable organic material under pressure from said accumulator zone into the mold to thereby fill the cavity in said mold, (e) initiating the curing of said materials by subjecting the materials to a temperature by heating the mold above the temperature at which the curing of said materials is initiated, and (f) opening said mold and removing the cured thermoset article therefrom.

The following examples serve to illustrate specific embodiments of this invention and it is not intended that the invention shall be limited by the examples.

EXAMPLE 1

Approximately 90 grams (approximately five 8×8 inch sheets) Type AKM glass mat (PPG Industries, Inc. Pittsburgh, Penn) was placed in a 8×8×⅛ inch mold preheated to 130° C. The mold was closed and a resin portion containing 50 weight percent ethoxylated bisphenol-A dimethacrylate, 50 weight percent styrene, 1 part per hundred resin (phr) t-butyl perbenzoate, and 0.2 phr "Zelec" UN mold release (an organophosphate mold release sold by E. I. DuPont de Nemours, Wilmington, Delaware) was injected into the mold. After 5 minutes the cured glass reinforced composite was removed from the mold. This composite contained 59 weight percent glass (the weight percent of glass in the composite was calculated by dividing the weight of the glass which was initially charged into the mold by the weight of the composite).

The composite had a flexural strength and modulus (as measured by ASTM D790-66) of 24,600 pounds per square inch (psi) and $1.31 \times 10^6$ psi, respectively; tensile strength and modulus (as measured by ASTM D638-64T) of 20,800 psi and $1.29 \times 10^6$ psi, respectively; and elongation at break (as measured by ASTM D638-64T) of 1.8 percent.

This property profile is very desirable for structural applications.

EXAMPLES 2 to 5

The procedure of Example 1 was exactly repeated except that styrene content was varied as shown in Table I. The weight percent of glass in the composite as well as the properties of flexural strength and modulus, tensile strength and modulus and elongation at break of the composite are shown in Table I.

The data of Table I show that high styrene levels can be used in the resin of this invention without adversely affecting the properties of a composite produced therefrom.

TABLE I

PROPERTIES OF GLASS REINFORCED COMPOSITES PREPARED FROM ETHOXYLATED BISPHENOL A DIMETHACRYLATE AND STYRENE

| Example | Styrene in resin % | Glass % | Flexural modulus psi | Flexural strength psi | Tensile modulus psi | Tensile strength psi | Elongation at break % |
|---|---|---|---|---|---|---|---|
| 2 | 60 | 52 | $1.50 \times 10^6$ | 32,900 | $1.33 \times 10^6$ | 23,600 | 2.1 |
| 3 | 70 | 57 | $1.39 \times 10^6$ | 27,200 | $1.44 \times 10^6$ | 23,800 | 1.9 |
| 4 | 75 | 52 | $1.36 \times 10^6$ | 33,700 | $1.38 \times 10^6$ | 24,500 | 2.1 |
| 5 | 80 | 51 | $1.26 \times 10^6$ | 23,800 | $1.33 \times 10^6$ | 22,600 | 2.0 |

EXAMPLES 6-10

The procedure of Example 1 was exactly repeated except that the resin portion consisted of tetraethylene glycol dimethacrylate, styrene, 1.0 phr t-butyl perbenzoate, and 0.2 phr Zelec UN. The styrene content of the resin was varied as shown in Table II.

The weight percent of glass in the composite as well as flexural strength and modulus, tensile strength and modulus, and elongation at break of the composite material is shown in Table II.

This data shows that high styrene levels can be used in the resin with no apparent loss in properties of the resulting composite. Such materials are suitable for structural applications.

TABLE II

PROPERTIES OF GLASS REINFORCED COMPOSITES PREPARED FROM TETRAETHYLENE GLYCOL DIMETHACRYLATE AND STYRENE

| Example | Styrene in resin % | Glass % | Flexural modulus psi | Flexural strength psi | Tensile modulus psi | Tensile strength psi | Elongation at break % |
|---|---|---|---|---|---|---|---|
| 6 | 50 | 50 | $1.10 \times 10^6$ | 25,300 | $1.12 \times 10^6$ | 19,200 | 1.9 |
| 7 | 60 | 54 | $1.36 \times 10^6$ | 29,200 | $1.23 \times 10^6$ | 21,200 | 2.1 |
| 8 | 70 | 57 | $1.48 \times 10^6$ | 35,000 | $1.39 \times 10^6$ | 24,700 | 2.1 |
| 9 | 78 | 52 | $1.37 \times 10^6$ | 30,200 | $1.33 \times 10^6$ | 23,300 | 2.1 |
| 10 | 82 | 58 | $1.53 \times 10^6$ | 31,000 | $1.59 \times 10^6$ | 28,700 | 2.1 |

EXAMPLES 11 to 18

The procedure of Example 1 was exactly repeated except that the mold temperature was 140° C., the molding time was three minutes, and the resin composition was prepared from the dimethacrylates as shown in Table III.

The weight percent of glass in the composite as well as flexural strength and modulus, tensile strength and modulus, and elongation at break of the composite are shown in Table III.

TABLE III

PROPERTIES OF GLASS REINFORCED COMPOSITES PREPARED FROM VARIOUS DIMETHACRYLATES AND STYRENE

| | Resin Composition | | Glass in composite (weight percent) | Flexural modulus psi | Flexural strength psi | Tensile modulus psi | Tensile strength psi | Elongation at break % |
|---|---|---|---|---|---|---|---|---|
| Example | Dimethacrylate | Styrene (weight percent) | | | | | | |
| 11 | triethylene glycol | 25 | 46 | $1.09 \times 10^6$ | 27,000 | $1.03 \times 10^6$ | 16,600 | 1.9 |
| 12 | " | 50 | 45 | $1.04 \times 10^6$ | 30,000 | $1.22 \times 10^6$ | 17,200 | 1.8 |
| 13 | " | 60 | 53 | $1.00 \times 10^6$ | 28,200 | $1.03 \times 10^6$ | 16,700 | 2.2 |
| 14 | diethylene glycol | 25 | 50 | $1.18 \times 10^6$ | 29,700 | $1.23 \times 10^6$ | 21,000 | 2.2 |
| 15 | " | 50 | 53 | $1.17 \times ^6$ | 21,000 | $1.01 \times 10^6$ | 17,000 | 2.0 |
| 16 | " | 60 | 49 | $1.08 \times 10^6$ | 24,100 | $1.30 \times 10^6$ | 21,400 | 2.1 |
| 17 | ethoxylated bisphenol A | 50 | 50 | $1.28 \times 10^6$ | 33,500 | $1.41 \times 10^6$ | 20,700 | 1.9 |
| 18 | " | 60 | 49 | $1.14 \times 10^6$ | 27,900 | $1.15 \times 10^6$ | 19,000 | 1.9 |

EXAMPLE 19

The procedure of Example 1 was exactly repeated except that the mold temperature was 140° C., molding time was three minutes, and the resin portion contained 75 weight percent ethoxylated bisphenol-A diacrylate, 25 weight percent styrene, 1.0 phr t-butyl perbenzoate, and 0.2 phr Zelec UN.

The resulting composite had the following properties:

| | |
|---|---|
| Flexural modulus | $1.27 \times 10^6$ psi |
| Flexural strength | 33,000 psi |
| Tensile modulus | $1.28 \times 10^6$ psi |
| Tensile strength | 20,300 psi |
| Elongation at break | 1.7% |

What is claimed is:

1. A molding composition for producing fiber reinforced molded articles comprising:
   (A) a curable resin portion containing:
   (i) from 5 to about 60 weight percent of a poly(acrylate) characterized by the following empirical formula:

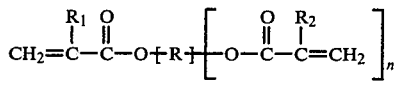

wherein R is the hydroxyl-free residue of an organic polyhydric alcohol which contained hydroxyl groups bonded to different carbon atoms, $R_1$ and $R_1$ are independently hydrogen or methyl, and n is 1 to 3, (ii) from about 5 to about 60 weight percent of a monoethylenically unsaturated monomer which is soluble in and copolymerizable with (i), wherein (i) plus (ii) have a viscosity of from about 1 to about 50 centipoise, (iii) from about 0.2 to about 3 weight percent of an elevated temperature free-radical curing catalyst capable of effecting the coreaction of (i) and (ii), and
   (B) one or more reinforcing fibers with a melting point or a glass transition temperature above about 130° C., wherein said fibers are present in amounts of from about 15 to about 80 weight percent; said weight percents in (A) and (B) being based on the total weight of the composition.

2. The composition of claim 1 wherein the fibers are selected from fiberglass, carbon fibers, and aromatic polyamide fibers.

3. The composition of claim 1 wherein the ethylenically unsaturated monomer is styrene.

4. A cured molded article formed from the composition of claim 1.

5. The composition of claim 1 wherein the fiber is fiberglass.

6. The composition of claim 1 wherein the fiber is carbon fiber.

7. The composition of claim 1 wherein the fiber is aromatic polyamide fibers.

8. The composition of claim 1 wherein the poly(acrylate) is ethoxylated bisphenol-A dimethacrylate.

9. The composition of claim 1 wherein the poly(acrylate) is tetraethylene glycol dimethacrylate.

10. The composition of claim 1 wherein the poly(acrylate) is triethylene glycol dimethacrylate.

11. The composition of claim 1 wherein the poly(acrylate) is diethylene glycol dimethacrylate.

12. The composition of claim 1 wherein (b) plus (c) has a viscosity of from about 1 to about 10 centipoise.

13. A process for producing high performance fiber reinforced thermoset molded articles which comprises:
(I) forming a mixture of:
(A) a curable resin portion containing:
(i) from 5 to about 60 weight percent of a poly(acrylate) characterized by the following empirical formula:

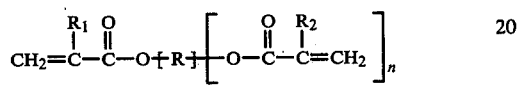

wherein R is the hydroxyl-free residue of an organic polyhydric alcohol which contained hydroxyl groups bonded to different carbon atoms, $R_1$ and $R_2$ are independently hydrogen or methyl, and n is 1 to 3, (ii) from about 5 to about 60 weight percent of a monoethylenically unsaturated monomer which is soluble in and copolymerizable with (i), wherein (i) plus (ii) have a viscosity of from about 1 to about 50 centipoise, (iii) from about 0.2 to about 3 weight percent of an elevated temperature free-radical curing catalyst capable of effecting the co-reaction of (i) and (ii), and
(B) one or more reinforcing fibers with a melting point or a glass transition temperature above about 130° C., wherein said fibers are present in amounts of from about 15 to about 80 weight percent; said weight percents in (A) and (B) being based on the total weight of the composition,
(II) providing said mixture into a heatable mold,
(III) molding said mixture at a temperature sufficient to cause the initiation of the co-reaction of (i) and (ii) at a temperature not greater than 150° C. and
(IV) completing said molding in less than 6 minutes from the time of initiation of said co-reaction.

* * * * *